United States Patent [19]
Wilson

[11] Patent Number: 5,351,802
[45] Date of Patent: Oct. 4, 1994

[54] METAL REMOVAL SYSTEM FOR CONVEYOR BELTS

[76] Inventor: William A. Wilson, 83 Pleasant Dr., SE., Marietta, Ga. 30067

[21] Appl. No.: 998,265

[22] Filed: Dec. 28, 1992

[51] Int. Cl.$^5$ ............................................. B65G 47/46
[52] U.S. Cl. ..................................... 198/367; 209/657
[58] Field of Search ...................... 209/657, 707, 922; 198/364, 365, 367

[56] References Cited

U.S. PATENT DOCUMENTS

| | | | |
|---|---|---|---|
| 2,537,005 | 1/1951 | Brown et al. | 198/367 X |
| 3,590,983 | 7/1971 | Oury | 198/364 X |
| 4,213,525 | 7/1980 | Scheppele | 198/367 X |
| 4,480,753 | 11/1984 | Thomas et al. | 209/657 X |
| 4,930,625 | 6/1990 | Wilson | 209/707 X |

FOREIGN PATENT DOCUMENTS

| | | | |
|---|---|---|---|
| 130090 | 11/1950 | Sweden | 198/367 |
| 1461719 | 2/1989 | U.S.S.R. | 198/367 |
| 1567469 | 5/1990 | U.S.S.R. | 198/367 |

*Primary Examiner*—D. Glenn Dayoan
*Attorney, Agent, or Firm*—Harry I. Leon; Vivian L. Steadman

[57] ABSTRACT

A system for detecting and removing metal objects from a continuously moving conveyor belt. The system includes mechanisms for lowering a scraper blade and for raising an assembly of horizontally disposed idlers mounted on a movable platform, which are activated simultaneously upon the approach of a metal object traveling on the belt. The idlers, when raised, cause a section of the belt, which is otherwise trough-like in shape, to flatten. The flattened section of the belt and the blade, in its lowered position, are disposed in close proximity to each other. The metal object and overburden moving with it on the flattened section of the belt are forced against the scraper blade. Set at an acute angle to the belt centerline, the blade deflects the metal object and overburden contaminated by it laterally, causing them to slide first onto an unsupported portion of the belt and then gently off of the belt itself. Once the metal object has been removed, the blade is raised and the platform is lowered, moving the idlers mounted on it out of contact with the belt. When not in use, these idlers are situated beneath an array of paired, downwardly sloping idlers. Even though a metal object is detected in a time interval between the detection and removal of another metal object traveling upstream of it on the belt, controls are provided to insure the removal of both metal objects.

3 Claims, 5 Drawing Sheets

METAL REMOVAL SYSTEM FOR CONVEYOR BELTS

BACKGROUND OF THE INVENTION

In many operations, equipment for processing raw materials received from a conveyor belt can be damaged when these materials are contaminated with metal objects. Prior to this invention, removal of metal objects from a moving belt was accomplished by stopping the belt and searching its overburden manually. The search was usually conducted immediately downstream of a metal detector which had signaled the presence of a metal object traveling on the belt. Only when the metal object had been found could operations be resumed. To reduce the time the conveyor belt might need to be shut down, personnel were employed to stand by and to be ready to search, at a moment's notice, for a metal object. This approach proved to be costly not only in terms of manpower but also in terms of production losses. Moreover, in situations in which two or more metal objects were traveling in close proximity to each other on the belt, the metal detector might indicate the presence of only one of these objects.

A mechanism for removing certain undesirable objects from a moving conveyor belt without stopping it is disclosed by Wilson in U.S. Pat. No. 5,018,619, issued May 28, 1991. Wilson's mechanism comprises an assembly of horizontally disposed idlers of varying lengths. The idlers in this assembly are so arrayed that they support a portion of the belt across substantially less than its entire width, thereby creating a soft spot in the belt. When oversized, but not necessarily metallic, objects traveling on the belt pass over the soft spot, the belt forms a chute, allowing the oversized objects to slide laterally and off of the belt. In the cited patent, separators are employed which selectively deflect oversized objects sideways and onto the soft spot; but these separators cannot distinguish between metallic and nonmetallic objects.

SUMMARY OF THE INVENTION

The primary object of the present invention is to provide a system for detecting and for removing metal objects from overburden traveling on a conveyor belt, without stopping the belt and without the use of manual labor.

A further object of the present invention is to provide a system capable of removing two or more metal objects from the overburden when these objects are situated in such close proximity to each other that a metal detector registers the presence of only one of these metal objects.

The system according to the present invention comprises a metal detector, a controller, and a metal removal station. The metal detector in the present invention is preferably one that can detect, across the entire transverse width of a narrow section of a conveyor belt, the presence of any metal object, whether ferrous or nonferrous tramp metal, traveling on the belt. The detector includes means for sending a signal upon detection of a metal object to the controller.

The controller in the present invention comprises a series of sets of timers and relays or, alternately, a programmable controller which incorporates the timers and relays under the control of a microprocessor. In the first set of timers and relays, a first timer, itself activated by the signal from the metal detector, then activates a second timer after a predetermined time interval has elapsed. In the preferred embodiment, the first timer is set to activate the second timer when the detected metal object has had sufficient time to move, on the conveyor belt, from the metal detector to a location proximate with the entrance to the metal removal station. Such a controller, incorporating as it does a time delay between the receipt by the first timer of the signal from the detector and activation of the second timer, allows the metal detector to be situated along a portion of the belt, such as a tunnel, which would be inconvenient to use for the purpose of cleaning the conveyor belt. The second timer, which is set to remain activated while the detected metal object traverses the length of the metal removal station, activates a relay which initiates and sustains operation of the metal removal station.

Preferably, a second set of timers is provided to keep track of metal objects which are detected by the metal detector prior to removal of the most recently detected metal object. If need be, additional sets of timers can be also be incorporated into the system. The preferred embodiment includes a system in which the controller has circuits capable of shutting down the conveyor belt in the event the metal removal station is activated multiple times in rapid succession, indicating either a severely metal-contaminated overburden or failure of the metal detector. Preferably, the controller includes a circuit in which signals indicating the detection by the system of two metal objects prior to the removal of an earlier detected metal object triggers means for stopping the conveyor belt, so that operators can determine the functional status of the system as well as the degree to which the overburden is contaminated with metal objects before continuing operations.

The controller further comprises means, including a warning horn, for signalling that the metal removal station has been activated.

In the preferred embodiment, the controller is a programmable controller incorporating all of the hereinabove-described controls in one unit and capable of being adapted to a wide range of conveyor belt configurations.

The metal removal station in the present invention comprises a scraper blade and a platform on which are mounted horizontally disposed idlers. When not in use, the platform-mounted idlers are situated below the conveyor belt and below an array of paired, downwardly sloping idlers, the paired idlers sloping towards the opposite ends of a third idler which is horizontally disposed and disposed between the paired idlers. Riding on the array of idlers, the belt assumes a trough-like shape.

The metal removal station further comprises means for simultaneously lowering the scraper blade and raising the platform so as to bring the horizontally disposed idlers mounted thereon above the array of idlers. As the platform is so raised, the horizontally disposed idlers lift the belt, causing it to assume a configuration in which a substantial section of the belt generally lies in an imaginary flat plane. At the same time the platform-mounted idlers are raising the belt, the scrapper blade is lowered until it rests near or just above the surface of the conveyor belt.

In use, the scraper blade and belt interact to scrape clean a section of the latter. As the belt moves overburden towards the stationary scraper blade, the overburden is forced against the blade. Upon encountering the blade, which is fixed at an angle with respect to the longitudinal centerline of the belt, the overburden experiences a component of force directed perpendicularly to the longitudinal centerline of the belt. Acted upon by this force, the overburden slides gently off of the belt. The scraper blade is sufficiently long that if two metal objects were located so close together on the belt that the metal detector indicates the presence of only one of the metal objects, both objects will still be scraped off of the conveyor belt.

In the preferred embodiment, the means for simultaneously lowering the scraper blade and raising the platform includes pneumatic cylinders. Alternately, the means for lowering the blade and raising the platform includes electrical drives or hydraulics. Means for activating the cylinders comprises the second timer of the controller. The second timer, when activated, opens a first valve which simultaneously lets pressurized air into a first end of each of the cylinders to raise the platform and to lower the scraper blade, with the pressurized air being maintained in the cylinders for the duration of the time interval during which the belt is scraped clean of overburden. Once this time interval, which is roughly equal to the length of time required for an object travelling on the belt to traverse the length of the metal removal station, is past, the second timer is deactivated, opening a second valve which directs pressurized air into a second end of each of the cylinders to raise the scraper blade and to lower the platform.

A full scale prototype of the metal removal system according to the present invention has been tested and was found to remove all of the metal objects which were purposely placed on the conveyor belt. In addition, the prototype model removed all of the metal objects detected by the metal detector without one single failure during an eighteen month testing period.

Figure 1:
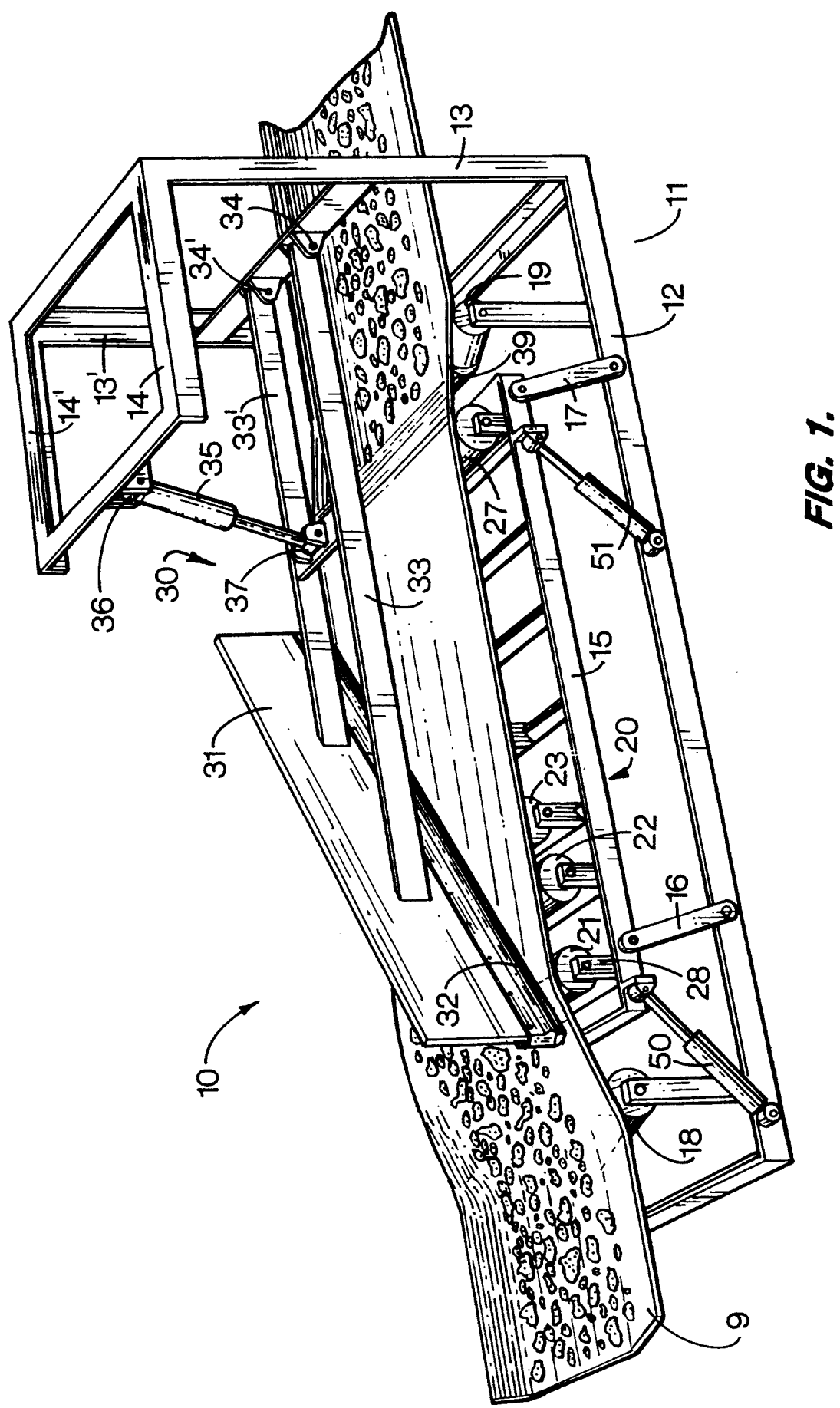
FIG. 1 is a perspective view of the metal removal station in the system according to the present invention in which the scraper blade is shown in its lowered position and the platform of horizontally disposed idlers is shown in its raised, active position.
Figure 3:
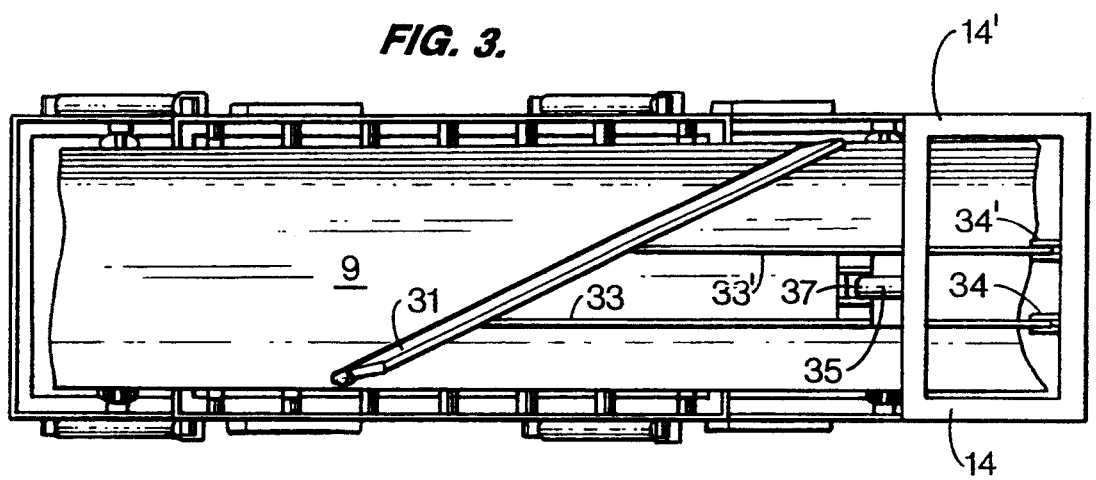
FIG. 3 is a top plan view of the metal removal station according to FIG. 1 in which the scrapper blade is shown in its raised position.
Figure 2:
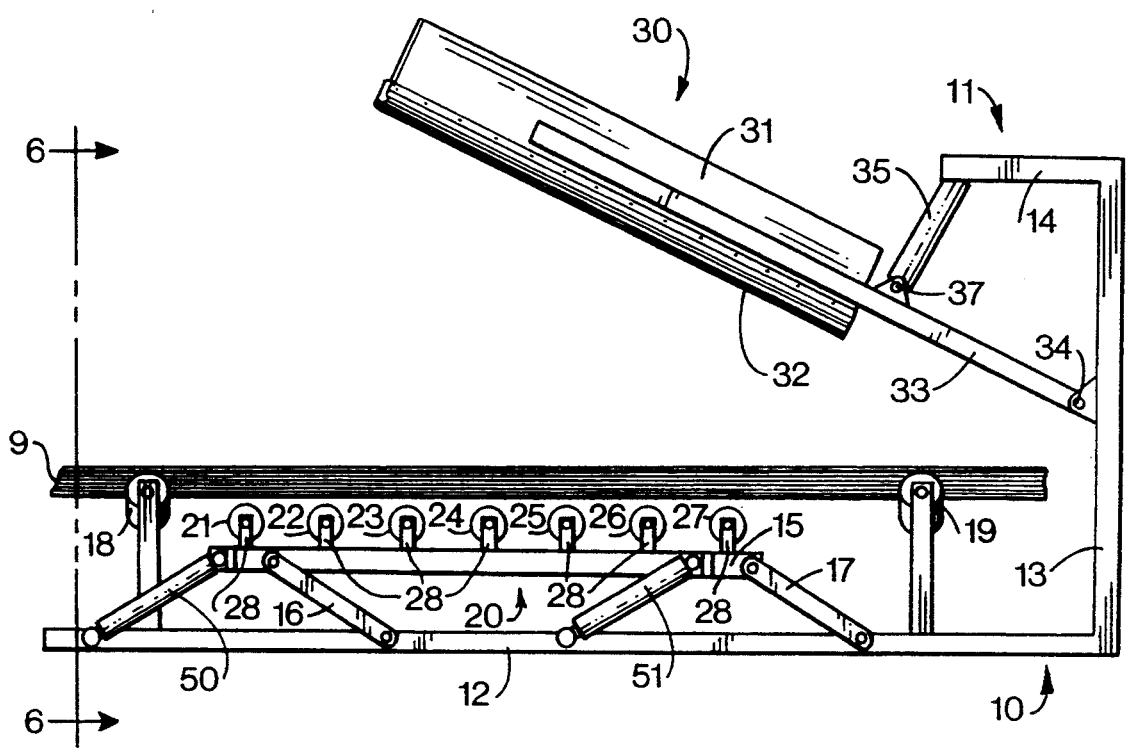
FIG. 2 is a side elevational view of the metal removal station according to FIG. 1 in which the scraper blade is shown in its raised position and the platform of horizontally disposed idlers is shown in its lowered, inactive position.
Figures 4, 5:
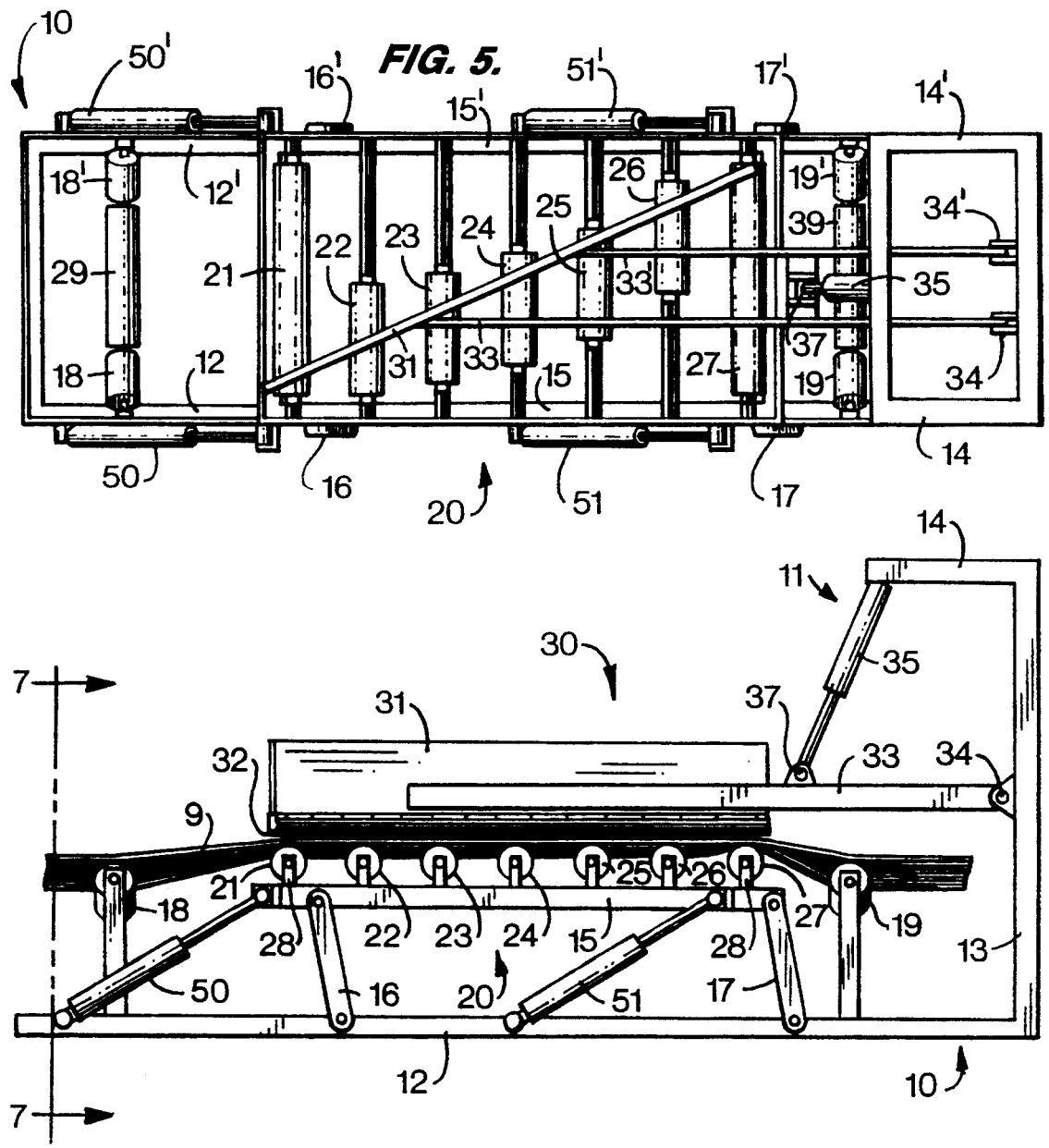
FIG. 4 is a side elevational view of the metal removal station according to FIG. 1 in which the scraper blade is shown in its lowered position and the platform of horizontally disposed idlers is shown in its raised, active position.
FIG. 5 is a top plan view of the metal removal station in which the scraper blade is shown in its lowered position and in which the platform of horizontally disposed idlers is shown in its raised, active position, the conveyor belt being not shown for clarity of illustration of the platform-mounted idlers.
Figure 6:
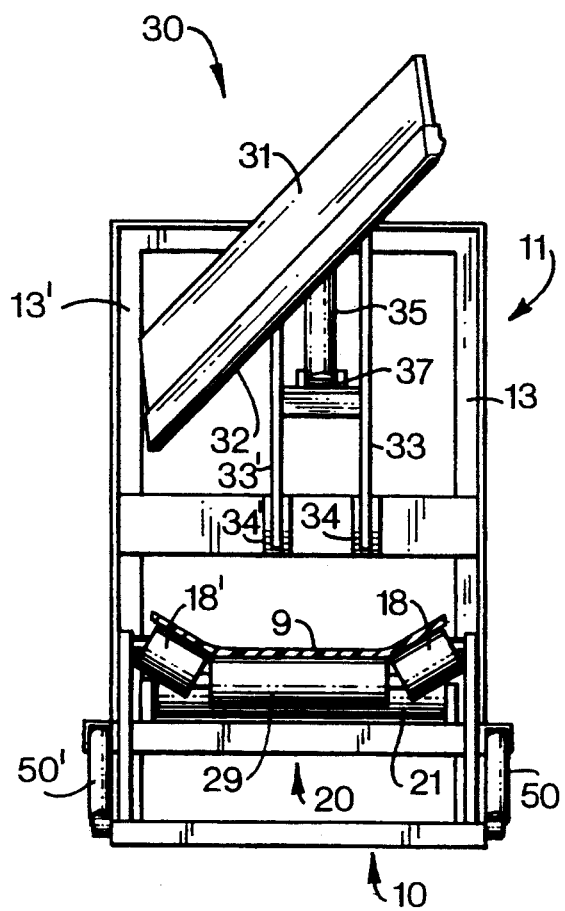
FIG. 6 is a cross-section 6—6 of FIG. 2.
Figure 7:
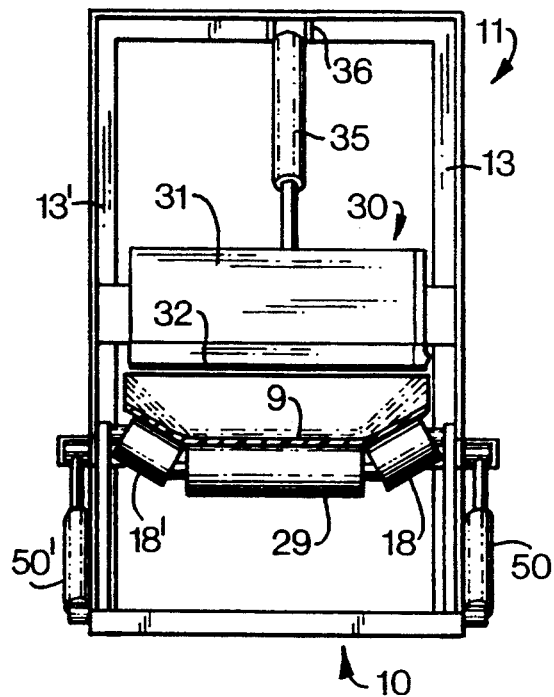
FIG. 7 is a cross-section 7—7 of FIG. 4.
Figure 8:
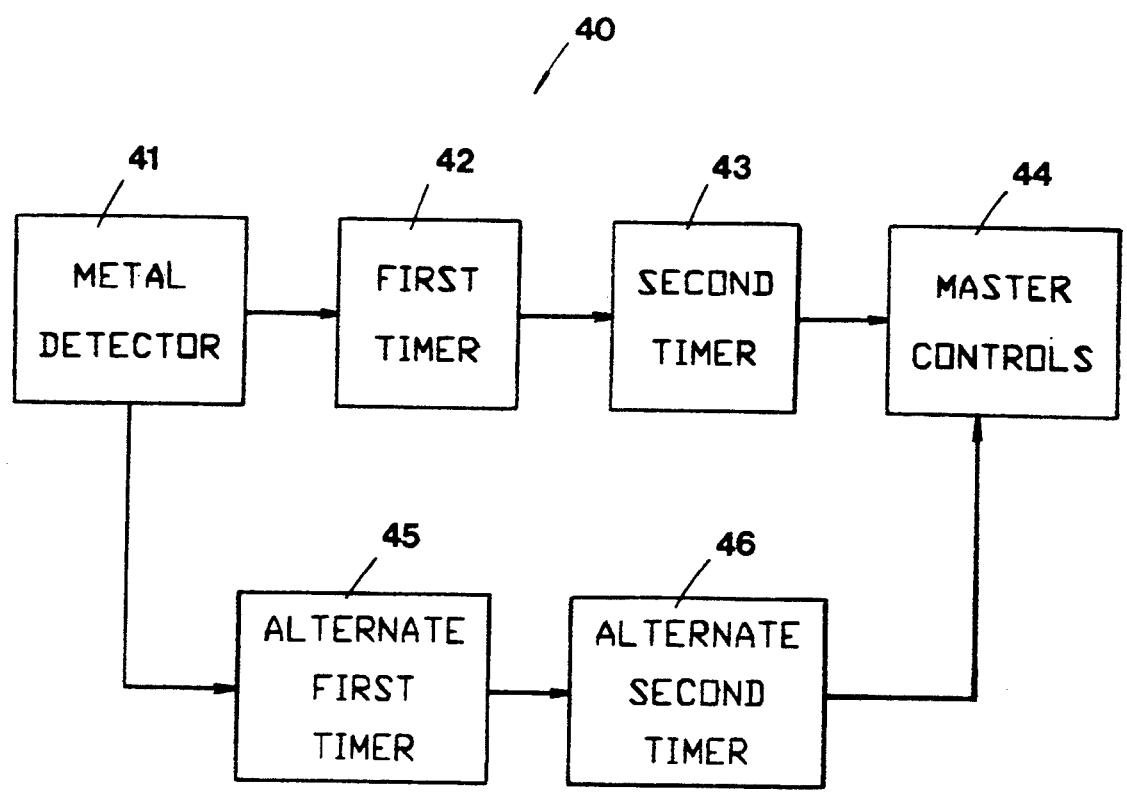
FIG. 8 is a block diagram of a controller for the metal removal system according to the present invention.

For clarity of illustration, idlers conventionally employed to support the conveyor belt, other than the idlers located immediately upstream and immediately downstream of the metal removal station, are not shown.

DETAILED DESCRIPTION OF THE PREFERRED EMBODIMENT

Referring to the drawings, a system for detecting metal objects and removing them from a conveyor belt 9 comprises a metal removal station indicated generally by the reference numeral 10 and a control assembly 40. The station 10 includes a frame 11; an array of horizontally disposed idlers which is indicated generally by the numeral 20; and a scraper blade assembly 30.

The frame 11 includes pairs of lower approximately horizontal frame sections 12, 12', vertical frame sections 13, 13' and upper frame sections 14, 14'.

The idler array 20 comprises a series of idlers 21, 22, 23, 24, 25, 26, and 27 which are generally one-half the width of the belt 9 in length and which are mounted on a movable platform including support rails 15, 15'. Each of these idlers is attached by suitable bearings blocks 28 to couples secured to the support rails 15, 15'. The idlers are positioned in a pattern such that when they are in contact with the belt 9, only a portion of the belt is supported. An unsupported part of the belt on one side thereof forms a soft spot which is employed as a chute when overburden is to be removed from the belt, following the teachings of Wilson in U.S. Pat. No. 5,018,619.

Alternately, the idler array comprises a series of idlers which are generally as long as the belt 9 is wide; and part of the belt is unsupported.

To facilitate raising and lowering the platform on which the idlers 21, 22, 23, 24, 25, 26, and 27 are mounted, the support rails 15, 15' are pivotally attached to the lower frame 12, 12' by two pairs of parallel support arms 16, 16'; 17, 17'. One end of each support arm 16, 16'; 17, 17' is pivotally connected to the lower frame section 12, 12', respectively, and the other end of the support arm is pivotally connected to the support rail 15, 15', respectively. Preferably, opposite ends of at least two sets of hydraulic cylinders 50, 50'; 51, 51' are also pivotally attached to the support rail 15, 15', respectively, and to the lower frame sections 12, 12', respectively.

The scraper blade assembly 30 comprises a blade 31 rigidly attached to support arms 33, 33'. The arms 33, 33' are pivotally connected to means, including a pneumatic cylinder 35, for lowering and raising the assembly 35, and to the supports 34, 34', respectively. The supports 34, 34' are attached to a frame cross member connecting vertical frame sections 13, 13'.

In order not to damage the conveyor belt 9, the scraper blade 31 has a non-abrasive edge 32 fabricated from rubber, plastic, wood, or the like. The edge 32 is preferably fastened to the blade 31 by bolts. In the preferred embodiment, elongated holes formed in the edge 32 are provided for receiving the bolts so that from time to time the edge can be lowered with respect to the blade 31 to compensate for wear.

In use, the blade 31 is lowered proximate with a portion of the belt 9 when it is supported by the platform-mounted idlers 21, 22, 23, 24, 25, 26, and 27. In the lowered position of the blade 31, the support arms 33, 33' extend approximately parallel to the belt 9 as does the blade edge 32, which presses firmly on the belt.

Preferably, means for raising and lowering the support arms 33, 33' comprises one or more pneumatic cylinders 35. As shown in FIG. 1, one end of the cylinder 35 is pivotally connected to a support 36 attached to a frame cross member which bridges the upper frame sections 14, 14' and other end of the cylinder is pivotally connected to the support 37 attached to a frame element which bridges the support arms 33, 33'.

The control assembly 40 comprises a metal detector 41 which generates a signal when a metal object has been detected on the conveyor belt 9. By way of example, suitable metal detectors for this application include the Scitronics Model 1080 Tramp Metal Detector and the Tectron Model 5000 Tramp Metal Detector.

Upon generating the signal indicating the presence of a metal object, the detector 41 also activates a first timer 42. The first timer 42 delays activation of a master control 44 for the metal removal station 10 until the detected metal object has moved to a point proximate with the entrance to the station. The first timer 42 then sends a signal to a second timer 43 as the detected metal object advances further towards the entrance to the station 10.

Next the second timer 43 proceeds to activate the master control 44 for a time period corresponding roughly to the length of time required for the metal object to move, on the conveyor belt, through the station 10. The master control 44 operates valves which simultaneously allow compressed air to enter the pneumatic cylinders 35, 50, 50'; 51, 51'. The cylinders in turn lower the scraper blade 31 and raise the platform-mounted idlers 21, 22, 23, 24, 25, 26, and 27. When the second timer 43 completes its cycle, the second timer activates controls which allow compressed air to retract all of the pneumatic cylinders 35, 50, 50', 51, 51'.

If, during the operation of the first or second timers, a second metal object is detected on the conveyor belt 9, an alternate pair of timers 45 and 46 are activated and perform functions which are similar to those performed by the timers 42 and 43, respectively.

Additional timer circuits are preferably provided to keep track of more than two metal objects travelling in close proximity to each other on the belt 9 as well as to sound a horn or even shut down the system if a predetermined number of metal objects are detected within a given time period.

For greatest flexibility of operation, a programmable controller is preferably employed, replacing the individual timers and timer circuit described hereinabove. A suitable model and manufacturer of a programmable controller is the Allen-Bradley model SLC 500 which includes 12 inputs and 8 outputs. Other programmable controllers of similar capabilities and function are available from a number of companies including: General Electric, Cuttler-Hammer, Square D, Midicon, Texas Instruments, Omron and Furnas.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A system adapted for removing metal objects from overburden moving on a conveyor belt capable of assuming a trough-like configuration and having at least one outer edge, comprising:

(a) a frame through which the conveyor belt moves;

(b) a platform having horizontally disposed idlers mounted thereon, the platform being pivotally mounted, beneath portions of the belt, on the frame;

(c) means for raising the platform so that the idlers can be brought into contact with the belt and cause the belt, which otherwise assumes a trough-like configuration, to flatten, the idlers mounted on the platform remaining fixed in inclination with respect to each other as the platform is being raised;

(d) a scraper blade mounted on the frame above said portions of the belt;

(e) means for lowering the scraper blade so that the blade can be brought into close proximity with said portions of the belt; and (f) means for controlling the raising of the platform and the lowering of the scraper blade so that the raising and lowering occur simultaneously.

2. The metal removal system according to claim 1 wherein the horizontally disposed idlers are further characterized as being substantially shorter in length than the belt is wide and wherein the scraper blade, when lowered proximate with the belt, is disposed at an angle thereto and directly above the idlers, a section of the conveyor belt between said outer edge and the scraper blade being unsupported by the idlers, so that when overburden on the belt accumulates against the scraper blade, the unsupported section of the belt sags, forming a chute through which overburden can flow easily off of the belt.

3. A system adapted for removing tramp metal from overburden moving on a conveyor belt capable of assuming a trough-like configuration and having at least one outer edge and a longitudinal centerline, comprising:

(a) a frame mounted beneath a conveyor belt;

(b) a platform having horizontally disposed idlers mounted thereon, the platform being pivotally mounted, beneath portions of the belt, on the frame;

(c) means for raising the platform so that the idlers can be brought into contact with portions of the conveyor belt and cause said portions thereof, which otherwise assume a trough-like configuration, to flatten;

(d) means for forming a discharge chute in the conveyor belt, the horizontally disposed idlers being substantially shorter in length than the belt is wide, a section of the conveyor belt disposed between said outer edge and points directly above ends of the horizontally disposed idlers proximate with the outer edge being unsupported by the idlers, so that when overburden on the belt accumulates on the unsupported section, the unsupported section sags, forming a chute through which overburden can flow easily off of the belt over said outer edge of the belt;

(e) means for controlling the raising of the platform of idlers so that the platform is raised only when tramp metal moves with the belt into close proximity of the platform; and (f) means for scraping the conveyor belt, the scraping means including at least one scraper blade which generally spans the belt in its entire width and is disposed at an acute angle to the longitudinal centerline of the belt, the blade being disposed directly above the idlers on the raised platform so that the scraping means causes overburden to accumulate on the unsupported section of the belt.

* * * * *